United States Patent
Smith

(10) Patent No.: US 11,577,292 B2
(45) Date of Patent: Feb. 14, 2023

(54) TUBE STIFFENING

(71) Applicant: Keystone Tower Systems, Inc., Denver, CO (US)

(72) Inventor: Eric D. Smith, Denver, CO (US)

(73) Assignee: KEYSTONE TOWER SYSTEMS, INC., Denver, CO (US)

(*) Notice: Subject to any disclaimer, the term of this patent is extended or adjusted under 35 U.S.C. 154(b) by 430 days.

(21) Appl. No.: 15/862,909

(22) Filed: Jan. 5, 2018

(65) Prior Publication Data

US 2018/0193892 A1 Jul. 12, 2018

Related U.S. Application Data

(60) Provisional application No. 62/443,243, filed on Jan. 6, 2017.

(51) Int. Cl.
*B21C 37/12* (2006.01)
*B23K 37/02* (2006.01)
(Continued)

(52) U.S. Cl.
CPC .......... *B21C 37/122* (2013.01); *B21C 37/127* (2013.01); *B23K 37/0276* (2013.01);
(Continued)

(58) Field of Classification Search
CPC . B21C 37/122; B21C 37/127; B21C 37/0276; B21C 37/128; B21C 37/12;
(Continued)

(56) References Cited

U.S. PATENT DOCUMENTS

| 379,937 | A | * | 3/1888 | Coas |
| 817,938 | A | * | 4/1906 | Stolp ...................... B21C 37/26 29/890.048 |

(Continued)

FOREIGN PATENT DOCUMENTS

| CN | 202195180 | 4/2012 |
| DE | 202007016314.2 | 3/2009 |

(Continued)

OTHER PUBLICATIONS

Ohashi—JP59113923A—Translation—Translated Aug. 19, 2020 (Year: 1984).*

(Continued)

*Primary Examiner* — Edward T Tolan
(74) *Attorney, Agent, or Firm* — The Marbury Law Group, PLLC

(57) ABSTRACT

Devices, systems, and methods are directed to formation of tubular structures, such as spirally formed structures, having spirally extending reinforcing material. In particular, tubular structures can be formed in a continuous process in which a first material is spiral formed along a first spiral and a second material is joined to the first material along a second spiral to reinforce the spirally formed first material. As compared to manual application of reinforcing material, such a continuous process can facilitate producing tubular structures at rates suitable for high-volume, commercial fabrication. Further, or instead, as compared to the use of circumferentially extending reinforcing material to support a spiral formed tube, reinforcing the spirally formed first material with a spiral of the second material may offer certain structural advantages, such as improved resistance to buckling.

20 Claims, 10 Drawing Sheets

(51) Int. Cl.
*F16L 9/04* (2006.01)
*F16L 9/16* (2006.01)
*F16L 57/02* (2006.01)

(52) U.S. Cl.
CPC .............. *F16L 9/042* (2013.01); *F16L 9/165* (2013.01); *F16L 57/02* (2013.01)

(58) Field of Classification Search
CPC ......... B21C 37/22; B21C 37/24; B21C 37/26; B21C 37/123; B21C 37/124; B21C 37/154; B21C 37/156; B21C 37/158; B21C 37/20; B21C 37/207; F16L 9/042; F16L 9/165; F16L 57/02; B23K 37/0276
USPC ........................................................... 72/49
See application file for complete search history.

(56) References Cited

U.S. PATENT DOCUMENTS

| | | | | |
|---|---|---|---|---|
| 2,549,032 | A * | 4/1951 | Hall | B21C 37/122 228/145 |
| 2,786,435 | A | 3/1957 | Ellzey | |
| 3,217,402 | A * | 11/1965 | Eckhardt | B21C 37/12 228/103 |
| 3,240,042 | A * | 3/1966 | Habdas | B21C 37/122 72/49 |
| 3,246,116 | A * | 4/1966 | Anderson | B21C 37/26 219/137 R |
| 3,362,058 | A * | 1/1968 | Morris | B21C 37/26 165/184 |
| 3,661,314 | A | 5/1972 | Tselikov et al. | |
| 3,693,648 | A * | 9/1972 | Sassin | F16L 9/19 174/15.5 |
| 3,828,158 | A * | 8/1974 | Sablotny | B23K 9/0325 219/62 |
| 4,429,654 | A * | 2/1984 | Smith, Sr. | F16L 9/16 114/65 R |
| 4,838,317 | A * | 6/1989 | Andre | F16L 57/06 138/122 |
| 5,316,606 | A * | 5/1994 | Andre | B21C 37/123 156/201 |
| 5,480,505 | A * | 1/1996 | Andre | B32B 15/08 156/244.11 |
| 5,607,529 | A | 3/1997 | Adamczyk et al. | |
| 5,637,168 | A * | 6/1997 | Carlson | B29C 53/582 156/143 |
| 5,957,366 | A * | 9/1999 | Friedrich | B21C 37/122 228/9 |
| 6,006,565 | A * | 12/1999 | Carson | F16L 9/165 72/49 |
| 8,941,023 | B2 | 1/2015 | Holste et al. | |
| 2002/0157721 | A1* | 10/2002 | Hirano | F16L 9/16 138/129 |
| 2010/0316466 | A1* | 12/2010 | Hettich | B21C 37/122 411/395 |
| 2016/0375476 | A1* | 12/2016 | Smith | B21C 37/128 72/8.9 |
| 2018/0009050 | A1* | 1/2018 | Tokita | B23K 9/0026 |
| 2018/0193892 | A1* | 7/2018 | Smith | B21C 37/127 |
| 2019/0070650 | A1* | 3/2019 | Wickman | C22C 38/32 |

FOREIGN PATENT DOCUMENTS

| | | | | |
|---|---|---|---|---|
| GB | 800798 | A * | 3/1958 | ............ B21C 37/26 |
| GB | 996133 | | 6/1965 | |
| GB | 1965193 | A * | 4/1967 | ............ B21C 37/26 |
| JP | 58-221617 | A * | 12/1983 | ............ B21C 37/26 |
| JP | 59-113923 | A * | 6/1984 | ............ B21C 37/26 |
| JP | 59113923 | A * | 6/1984 | ............ B21C 37/26 |
| WO | WO-2018129256 | | 7/2018 | |

OTHER PUBLICATIONS

"Corrugated stainless steel fin pipe", Guangzhou Qingli Thermal Energy Mechanical Equipment Co., Ltd., https://www.alibaba.com/product-detail/Corrugated-stainless-steel-fin-pipe_60636532148.html?spm=a2700.7724857.main07.80.5b90aa9aqXJaMC Jan. 1, 2011, 6 pages.

ISA, "PCT Application No. PCT/US18/12489 International Search Report and Written Opinion dated May 4, 2018", 13 pages.

WIPO, "PCT Application No. PCT/US18/12489 International Preliminary Report on Patentability dated Jul. 18, 2019", 10 pages.

* cited by examiner

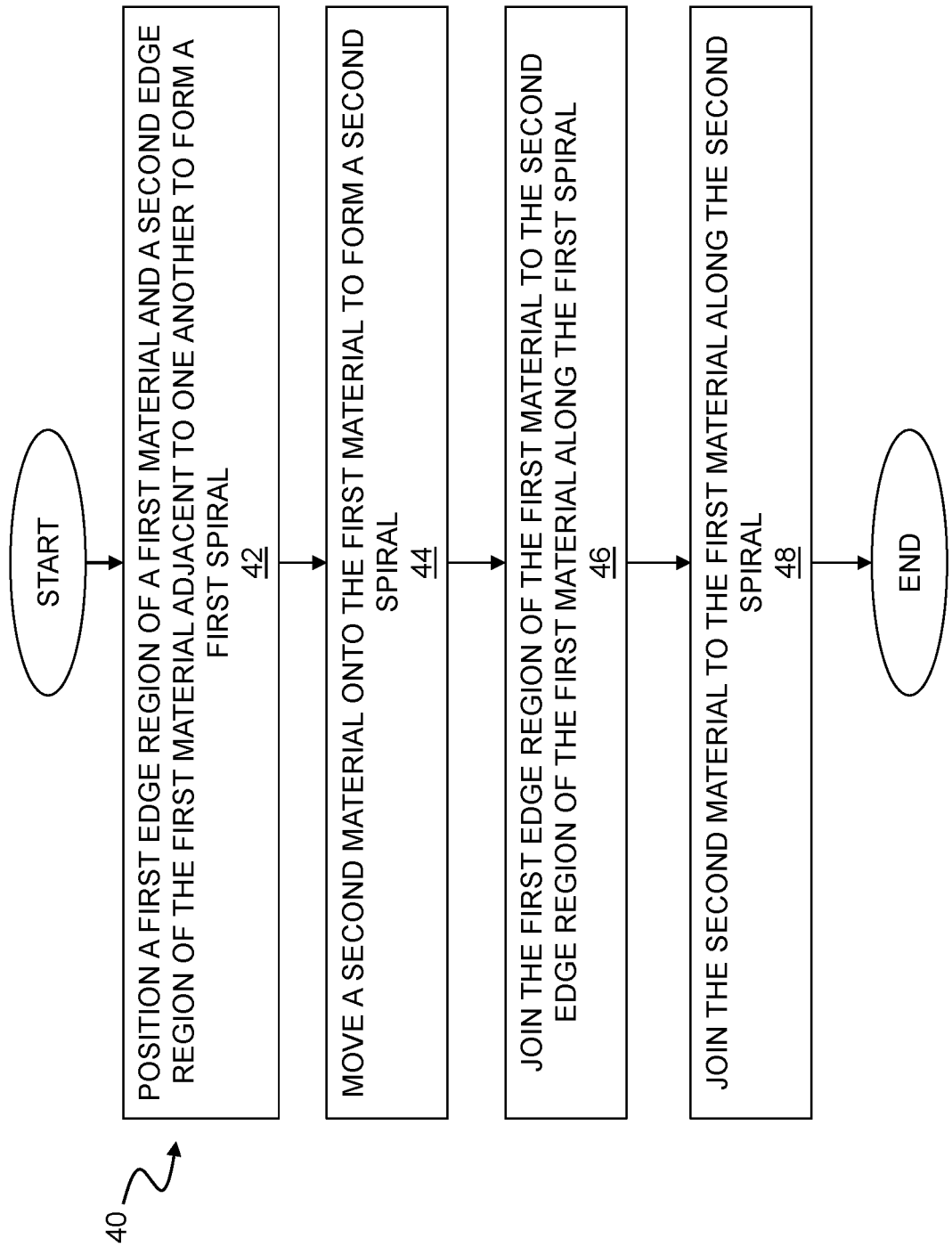

TUBE STIFFENING

CROSS-REFERENCE TO RELATED APPLICATIONS

This application claims the benefit of U.S. Provisional Patent Application No. 62/443,243, filed on Jan. 6, 2017, the entire contents of which are incorporated herein by reference.

BACKGROUND

Tubes are ubiquitous in industrial applications, with some common uses including supporting wind turbines (or other machinery) and transporting fluid. Often, the design features of a tube are selected to reduce the likelihood of buckling under anticipated loading of the tube for a particular application. For example, wall thickness of a tube may be selected to achieve desired stiffness and/or strength of the tube. Increasing wall thickness to achieve a corresponding increase in stiffness and/or strength, however, may result in an inefficient use of material. That is, in some instances, the amount of added stiffness or strength achieved by increasing wall thickness is less than could be achieved by adding the same amount of material in a different manner. Also, increasing wall thickness may result in undesired additional weight.

In applications in which it is undesirable or inefficient to add material thickness to the entire tube, reinforcing material is sometimes positioned circumferentially about a tube. Such circumferential reinforcement, however, is applied in a manual process that significantly increases the cost, and decreases the throughput, of a production process of the structure being formed. Accordingly, there remains a need for a cost-effective and efficient production of tubes having selectively applied reinforcing material.

SUMMARY

Devices, systems, and methods are directed to formation of tubular structures, such as spirally formed structures, having spirally extending reinforcing material. In particular, tubular structures may be formed in a continuous process in which a first material is spiral formed along a first spiral and a second material is joined to the first material along a second spiral to reinforce the spirally formed first material. As compared to manual application of reinforcing material, such a continuous process may facilitate producing tubular structures at rates suitable for high-volume, commercial fabrication. Further, or instead, as compared to the use of circumferentially extending reinforcing material to support a spiral formed tube, reinforcing the spirally formed first material with a spiral of the second material may offer certain structural advantages, such as improved resistance to buckling.

According to one aspect, a method for forming a tubular structure may include positioning a first edge region of a first material and a second edge region of the first material adjacent to one another to form a first spiral, moving a second material onto the first material to form a second spiral as the first spiral is being formed, joining the first edge region of the first material to the second edge region of the first material along the first spiral, and joining the second material to the first material along the second spiral.

In certain implementations, the first edge region of the first material and the second edge region of the first material may be positioned adjacent to one another to form the first spiral substantially continuously as the tubular structure is being formed. For example, the second material is moved onto the first material substantially continuously as the tubular structure is being formed.

In some implementations, the first spiral may be formed at a rate substantially equal to a rate at which the second spiral is formed.

In certain implementations, the first edge region of the first material may be joined to the second edge region of the first material along the first spiral at a rate substantially equal to a rate at which the second material is joined to the first material along the second spiral.

In some implementations, along at least a portion of the second spiral, the second material is joined to the first material as the first edge region of the first material is joined to the second edge region of the first material along the first spiral.

In certain implementations, with the first edge region and the second edge region of the first material adjacent to one another, the first material may have a substantially cylindrical shape. Additionally, or alternatively, joining the second material to the first material may include joining the second material to an outer surface of the substantially cylindrical shape.

In some implementations, the first spiral and the second spiral may each have substantially the same pitch. Further, or instead, a pitch of the second spiral may vary and an average pitch of the second spiral may be substantially equal to a pitch of the first spiral.

In certain implementations, the second spiral may be at a substantially fixed distance from the first spiral.

In some implementations, at least one of the first material and the second material may be a metal. Additionally, or alternatively, first material may be the same composition as the second material. Further, or instead, joining the second material to the first material may include welding the second material to the first material.

In certain implementations, joining the first edge region of the first material to the second edge region of the first material along the first spiral may include welding the first edge region of the first material to the second edge region of the first material.

In some implementations, the second material may be elongate and moving the second material onto the first material may include positioning an elongate dimension of the second material in contact with the first material. Further, or instead, a first surface of the second material in contact with the first material may have a first area, and a second surface of the second material extending away from the first material may have a second area greater than the first area.

In some implementations, positioning the first edge region of the first material and the second edge region of the first material adjacent to one another may include moving the first material through a first forming roll. Further, or instead, moving the second material onto the first material to form the second spiral may include moving the second material through a guide. For example, moving the second material onto the first material may further include directing the second material through a second forming roll, the second forming roll moving the second material toward the guide.

In certain implementations, the second material may have a first edge and a second edge, the first edge opposite the second edge, and moving the second material onto the first material may include bending the first edge of the second material to match a radius of curvature of the first material along the second spiral. The first edge of the second material may, for example, have a first corrugated pattern as the second material is moved onto the first material. Further, or instead, the second edge of the second material may have a second corrugated pattern as the second material is moved onto the first material. As an example, the first corrugated pattern and the second corrugated pattern may be substantially the same prior to moving the second material onto the first material to form the second spiral, and bending the first edge of the second material to match the radius of curvature of the first material along the second spiral may include changing the first corrugated pattern relative to the second corrugated pattern. Additionally, or alternatively, the first edge and the second edge of the second material may each be noncorrugated prior to moving the second material onto the first material to form the second spiral, and bending the first edge of the second material to match the radius of curvature of the first material along the second spiral may include forming a first corrugated pattern along the first edge of the second material. In certain instances, the second edge of the second material may remain noncorrugated as the first corrugated pattern is formed along the first edge of the second material.

According to another aspect, a tubular structure may include a first material having a first edge region and a second edge region, the first edge region and the second edge region joined to one another along a first spiral extending along the tubular structure, and a second material joined to the first material along a second spiral extending along the tubular structure, the second material having a first edge and a second edge, the first edge opposite the second edge, the first edge having a first corrugated pattern in contact with the first material along the second spiral.

In certain implementations, the first edge of the first material may match a radius of curvature of the first material along the second spiral.

In some implementations, the second edge may have a second corrugated pattern away from the first material. For example, the first corrugated pattern of the first edge may have a first amplitude, the second corrugated pattern of the second edge may have a second amplitude, and the first amplitude is different from the second amplitude. As a more specific example, the first amplitude of the first corrugated pattern may be greater than the second amplitude of the second corrugated pattern.

In certain implementations, the second edge may be away from the first material and noncorrugated.

In some implementations, the first material may have a substantially cylindrical shape.

In certain implementations, the second material may be joined to an outer surface of the first material.

In some implementations, the first spiral may be longitudinally coextensive with the second spiral along the tubular structure. Further, or instead, the first spiral and the second spiral may have substantially the same pitch. Still further or instead, the second spiral may be spaced at a substantially fixed distance relative to the first spiral.

In certain implementations, at least one of the first material and the second material is metal. Additionally, or alternatively, the first material and the second material may have the same composition. For example, the second material may be welded to the first material.

In some implementations, the second material may be a continuous elongate strip.

According to another aspect, a fabrication system for forming a tubular structure may include a first forming roll, a second forming roll, and a guide. The first forming roll may be positioned to receive a sheet of a first material, the first forming roll including a plurality of roll banks (e.g., a triple roll) spaced relative to one another to position a first edge portion of the first material and a second edge portion of the first material adjacent to one another to form a first spiral as the first material moves through the first forming roll. The second forming roll may include a plurality of rollers spaced relative to one another to curve a second material to match a radius of curvature of the first material exiting the first forming roll. The guide may be positioned relative to the second forming roll and the first forming roll to position the second material exiting the second forming roll onto the first material to form a second spiral.

In some implementations, the fabrication system may further include a feed system positioned to move the sheet of the first material in a first feed direction into the first forming roll. Additionally, or alternatively, the plurality of rollers of the second forming roll may be driven to move the second material through the second forming roll. In certain instances, the fabrication system may further include a controller in communication with each of the feed system and the plurality of rollers of the second forming roll, and the controller may be configured to drive the feed system to move the sheet of the first material in the first feed direction at a first rate and to drive the plurality of rollers of the second forming roll to move the second material through the second forming roll at a second rate. The first rate may be, for example, substantially the same as the second rate. Still further in addition or in the alternative, the fabrication system may include a first weld head positioned relative to the first forming roll to weld the first material along the first spiral, and a second weld head positioned relative to the guide to weld the second material to the first material along the second spiral. In some instances, the controller may be in communication with each of the first weld head and the second weld head, and the controller may be further or alternatively configured to control weld parameters of the first weld head based on the first rate of the first material in the first feed direction and to control weld parameters of the second weld head based on the second rate of the second material through the second forming roll. In certain instances, the controller may be further configured to move the first weld head to track the first spiral and to move the second weld head to track the second spiral.

Other aspects, features, and advantages will be apparent from the description and drawings, and from the claims.

BRIEF DESCRIPTION OF THE FIGURES

FIG. 4 is a flowchart of an exemplary method of forming a tubular structure including a reinforced spiral formed tube.

Like reference symbols in the various drawings indicate like elements.

DETAILED DESCRIPTION

Figure 1A:
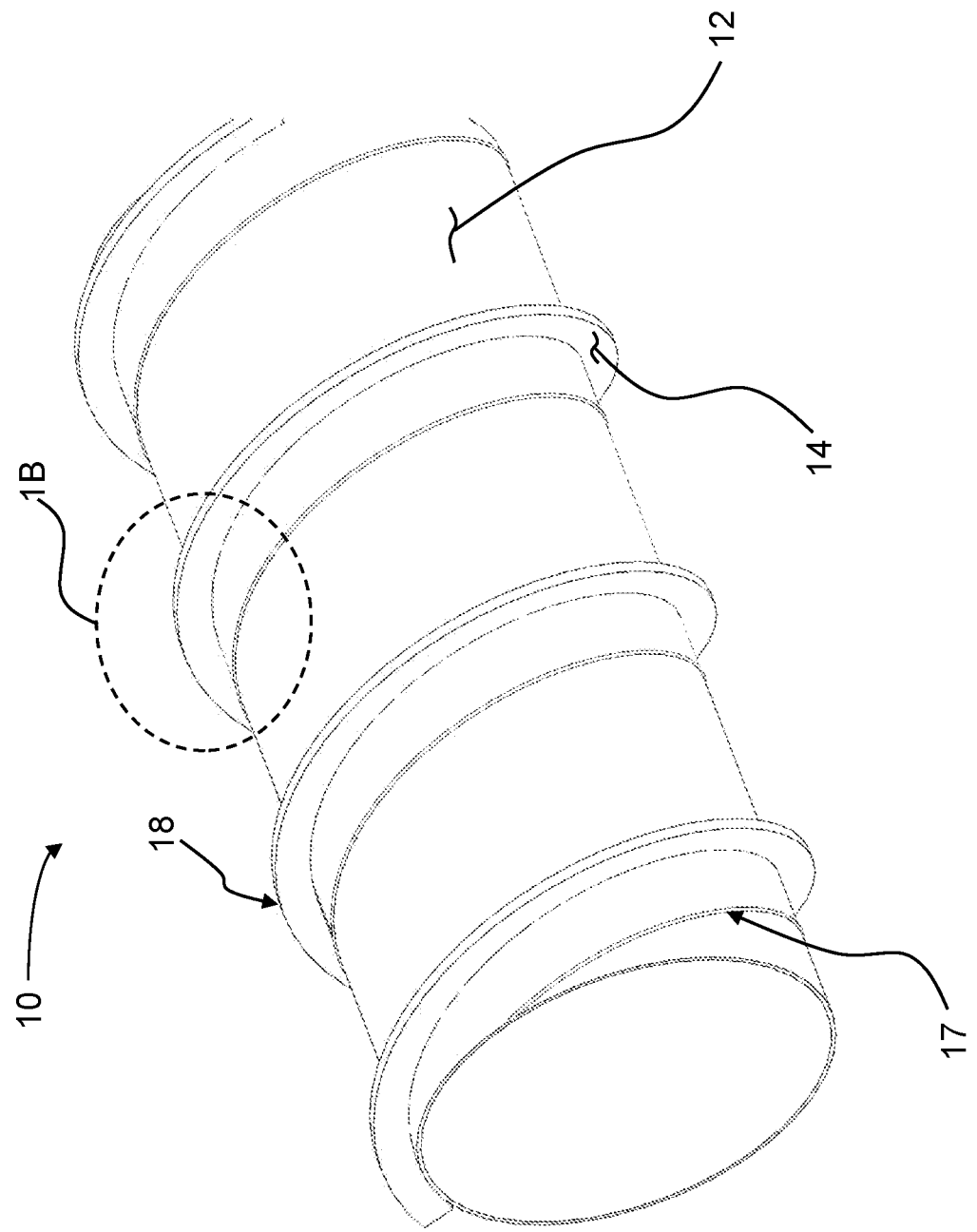
FIG. 1A is a perspective side view of a tubular structure.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and, similarly, the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially" or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," and "second," and the like, are words of convenience and are not to be construed as limiting terms unless specifically stated.

The devices, systems, and methods of the present disclosure are described with respect to spiral structural reinforcement of spirally formed tube. However, this is by way of example and should not be understood to limit the presently disclosed devices, systems, and methods in any way. That is, in general, the devices, systems, and methods of the present disclosure may be used as part of a continuous production process to add spiral material to a spirally formed tube to achieve any one or more of various different advantages. For example, unless otherwise specified or made clear from the context, the devices, systems, and methods of the present disclosure may be used to add spiral material to spirally formed tube to enhance heat transfer characteristics of the spirally formed pipe. Additionally, or alternatively, unless otherwise specified or made clear from the context, the devices, systems, and methods of the present disclosure may be used to add material to spirally formed tube to facilitate directing fluid (e.g., air and/or water) around the tube.

Figure 1B:
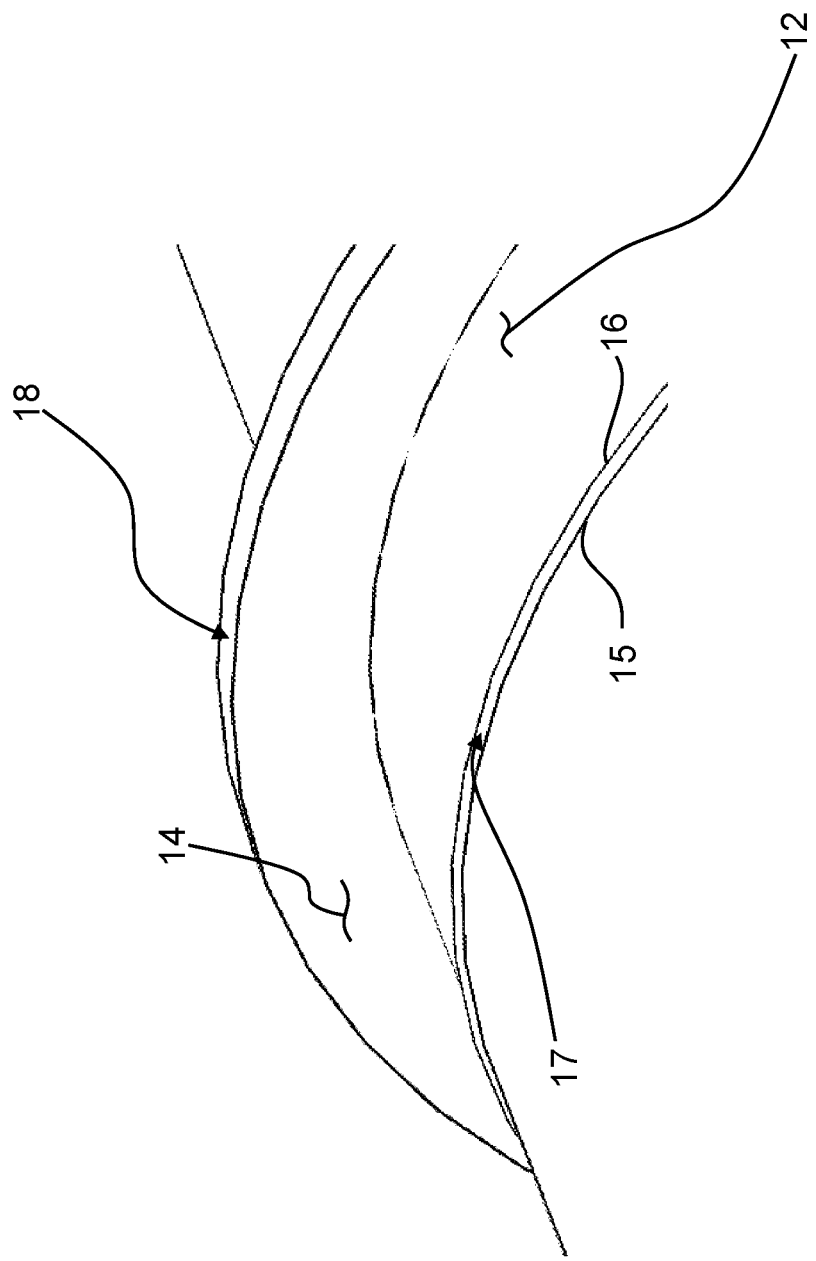
FIG. 1B is a perspective side view of the portion tubular structure along the area of detail 1B in FIG. 1A.

Referring to FIGS. 1A and 1B, a tubular structure 10 may include a first material 12 and a second material 14. The first material 12 may include a first edge region 15 and a second edge region 16 joined to one another along a first spiral 17 extending along the tubular structure 10. The second material 14 may be joined to the first material along a second spiral 18 extending along the tubular structure. As described in greater detail below, the second spiral 18 of the second material 14 may reinforce the tubular shape of the first material 12 such that, as compared to the tubular shape of the first material 12 alone, the tubular structure 10 has an improved resistance to buckling. As also described in greater detail below, the arrangement of the second material 14 along the second spiral 18 of the tubular structure 10 may facilitate forming a structurally reinforced tube through a continuous process which, as compared to manual reinforcement techniques, is better suited for high-volume and cost-effective fabrication.

In use, the tubular structure 10 may be used in any one or more of various different industrial applications in which a tube, or other similar hollow structure, is used to support one or more loads, transport one or more fluids, transfer heat, or a combination thereof. For example, with reinforcement provided by the second material 14 along the second spiral 18, the tubular structure 10 may be particularly useful solution for resisting buckling in vacuum applications. Additionally, or alternatively, because the tubular structure 10 is reinforced and may be formed through a continuous process, the tubular structure 10 may be particularly well-suited as a cost-effective solution in applications requiring, or benefitting from, large sizes. For example, the tubular structure 10 may be particularly useful as a solution for forming at least a portion of a tower supporting a wind turbine or other similar machinery.

The first edge region 15 and the second edge region 16 of the first material 12 may be positioned adjacent to one another along the first spiral 17 through a spiral forming process, described in greater detail below. In this adjacent position, the first edge region 15 and the second edge region 16 of the first material may be joined to one another to form the first material 12 into a tubular shape through a continuous process. As used herein, the tubular shape formed by the first material 12 shall be understood to be any longitudinal, hollow shape formed through a continuous process. For ease of illustration, the tubular shape of the first material 12 is shown as being cylindrical, such as may be useful in using the tubular structure 10 in piping applications. It should be appreciated, however, the first material 12 may further or instead be formed into other types of tubular shapes. As an example, unless otherwise specified or made clear from the context, it should be understood that the first material 12 may be formed into a frusto-conical shape, such as may be useful in using the tubular structure 10 as a support structure.

In general, without reinforcement, the tubular shape formed by the first material 12 may preferentially buckle along the first spiral 17. Without wishing to be bound by theory, it is believed that preferential buckling along the first spiral 17 may occur because a seam—even a high-quality seam—formed by joining the first edge region 15 to the second edge region 16 includes imperfections where stress may become concentrated. —An efficient way to counteract this buckling is to apply reinforcement along the same spiral path or along a second spiral path a substantially fixed distance from the first spiral path. That is, applying reinforcement along a path with the same spiral shape may reduce the likelihood of buckling along this path, so that a smaller amount of reinforcement material can be used to achieve the same increase in strength of a reinforcement applied along a different path. To achieve this, the second material 14 may be joined to the first material 12 along the second spiral 18 to form the tubular structure 10.

With the second material 14 arranged along the second spiral 18, the second material may provide structural support to the first material 12 along a longitudinal direction and along a radial direction of the tubular shape formed by the first material 12. Thus, as compared to the use of circumferential reinforcement rings, the second material 14 may improve the strength and/or stiffness of the tubular shape of the first material 12. Further, or instead, because the second spiral 18 is a continuous shape, the second material 14 may be continuously joined to the first material 12, whereas connecting circumferential reinforcement rings to a tubular shape requires a time-consuming and costly manual process. Further, or instead, the first spiral 17 and the second spiral 18 may be longitudinally coextensive with one another along the longitudinal direction of the tubular shape formed by the first material 12, thus providing support along an entire length of the tubular structure 10.

In certain implementations, the second spiral 18 may be joined to the first material 12 such that the first spiral 17 and the second spiral 18 each have the same pitch. For example, the second spiral 18 may be joined to the first material 12 at a substantially fixed distance (e.g., a fixed longitudinal distance) relative to the first spiral 17. Continuing with this example, spacing the second spiral 18 from the first spiral 17 along the first material may be useful for continuously forming the tubular structure 10, particularly in implementations in which the first spiral 17 and the second spiral 18 are formed contemporaneously. That is, among other advantages, spacing the second spiral 18 from the first spiral 17 may reduce the likelihood that respective joining processes, such as welding, associated with the first spiral 17 and the second spiral 18 will interfere with one another as the tubular structure 10 is continuously formed.

In certain implementations, the first material 12 and the second material 14 may be formed of the same material and, in particular, formed of the same metal. Thus, for example, the second material 14 may be welded to the first material 12. Such a weld may be useful for forming a robust connection between the second material 14 and the first material 12 such that the reinforcement provided by the second material 14 is consistent along the tubular shape of the first material 12. Further, or instead, in instances in which the second material 14 forms at least a part of a heat sink, the weld may facilitate efficient heat transfer from an internal surface of the tubular shape of the first material 12 to the second material 14 along the second spiral 18.

The second material 14 may be any of various different shapes positionable along the second spiral 18. For example, the shape of the second material 14 may be based on considerations associated with structural reinforcement. Further, or instead, the shape of the second material 14 may be based on considerations associated with heat transfer. In certain instances, the second material 14 may have a rectangular cross-section in a radial direction of the tubular shape of the first material 12. For example, a shorter side of the rectangular cross-section may be in contact with the first material 12 such that a longer side of the rectangular cross-section extends in a radial direction away from the first material 12. With a longer side of the rectangular cross-section extending in the radial direction away from the first material 12, an orientation of a rectangular cross-section of the second material 14 may be particularly useful for providing resistance to buckling and, further or instead, may advantageously provide a large exposed surface area useful for convective heat transfer to fluid moving outside of the tubular structure 10.

Referring now to FIGS. 1A, 1B, 2, and 3A-D, a fabrication system 20 may include a first stock source 21a, a second stock source 21b, a feed system 22, a first forming roll 23, a second forming roll 24, a guide 25, a first weld head 26, a second weld head 27, and a controller 28. As described in greater detail below, the fabrication system 20 may be operable to fabricate the tubular structure 10 according to any one or more of the methods described herein. The controller 28 may be in communication (e.g., electrical communication) with at least one of the first stock source 21a, the second stock source 21b, the feed system 22, the first forming roll 23, the second forming roll 24, the guide 25, the first weld head 26, and the second weld head 27. In some implementations, the controller 28 may control more or fewer components of the fabrication system 20, and any combinations thereof. For example, the controller 28 may additionally control a runout system to move formed portions of the tubular structure 10 in a direction away from the first forming roll 23, the guide 25, the first weld head 26, and/or the second weld head 27. For clarity of explanation, the operation of the fabrication system 20 is described with respect to forming the first material 12 into a cylindrical tubular shape and reinforcing the cylindrical tubular shape with the second material 14. It should be appreciated, however, that other types of tubular shapes (e.g., frustoconical shapes) may also or instead be fabricated using these techniques.

The controller 28 may include a processing unit 29a and a storage medium 29b in communication with the processing unit 29a. The processing unit 29a may include one or more processors, and the storage medium 29b may be a non-transitory, computer-readable storage medium. The storage medium 29b may store computer-executable instructions that, when executed by the processing unit 29a, cause the fabrication system 20 to carry out any one or more of the fabrication methods described herein. Optionally, the controller 28 may include an input device (e.g., a keyboard, a mouse, and/or a graphical user interface) in communication with the processing unit 29a and the storage medium 29b such that the processing unit 29a is additionally, or alternatively, responsive to input received through the input device as the processing unit 29a executes one or more of the fabrication methods described herein. As an example, the processing unit 29a may be responsive to input corresponding to target dimensions of the tubular structure 10.

More generally, the controller 28 may include any processing circuitry configured to receive sensor signals and responsively control operation of the fabrication system 20. This can, for example, include dedicated circuitry operable to execute processing logic as desired or required, or this can include a microcontroller, a proportional-integral-derivative controller, or any other programmable processor controller. This can also or instead include a general-purpose microprocessor, memory, and related processing circuitry configured by computer executable code, stored on the storage medium 29b, to perform the various control steps and operations described herein. The first stock source 21a can include one or more planar sheets of the first material 12, which can be stored in a magazine or other suitable dispenser to facilitate selection and loading of the one or more sheets during manufacturing. For the sake of efficient and clear explanation, the first stock source 21a is described with respect to a planar sheet 30 of the first material 12. It should be appreciated, however, that the manipulation of the planar sheet 30 may be repeated as necessary to form the tubular structure 10. For example, the planar sheet 30 may be joined (e.g., welded) to one or more additional planar sheets between the first stock source 21a and the feed system 22 to provide a continuous source of the first material 12 moving through the fabrication system 20, as may be useful for any one or more of the continuous processes described herein. Further, or instead, the first stock source 21a may include a coil of the first material 12 that is flattened continuously into a planar strip as the first material 12 is uncoiled, providing a continuous source of material.

The feed system 22 may be operable to transport the planar sheet 30 from the first stock source 21a to and/or through the first forming roll 23. The feed system 22 may include, for example, one or more pairs of drive rolls. In use, one or more pairs of drive rolls may pinch the planar sheet 30 such that rotation of the drive rolls can move the planar sheet 30 along a first feed direction "F1." In certain implementations, the first feed direction "F1" may be substantially constant (e.g., with the one or more pairs of drive rolls in a substantially stationary position as the rotation of the one or more pairs of drive rolls moves the planar sheet 30 to and/or through the first forming roll 23). Additionally, or alternatively, the first feed direction "F1" may change such that the planar sheet 30 undergoes rotational motion and/or substantially rotational motion as the planar sheet 30 is moved to and/or through the first forming roll 23. Such changes in the first feed direction "F1" may be useful for aligning the first edge region 15 and the second edge region 16 of the planar sheet 30 of the first material 12 along the first spiral 17 to form any one or more of the structures described herein. Examples of such changes in the first feed direction "F1" to produce rotational and/or substantially rotational motion as part of the fabrication process of the tubular structures are described in U.S. Pat. No. 9,302,303, issued Apr. 5, 2016, and U.S. Pat. App. Pub. No. 2015/0273550, filed Mar. 28, 2014, the entire contents of each of which are incorporated herein by reference. More generally, any equipment suitable for moving planar material according to any one or more of various different techniques known in the art can be used to move the planar sheet 30 from the first stock source 21a, and in some instances through, the first forming roll 23. Such equipment can include, for example, robotic arms, pistons, servo motors, screws, actuators, rollers, drivers, electromagnets, or combinations thereof.

The first forming roll 23 may impart a controllable degree of curvature to the planar sheet 30 fed into it in the first feed direction "F1." The first forming roll 23 may, for example, include roll banks 32a, 32b, 32c, positioned relative to one another and to the planar sheet 30 to impart curvature to the planar sheet 30 fed through the roll banks 32a, 32b, 32c. In certain instances, the roll banks 32a, 32b, 32c may be arranged as a triple-roll and, further or instead, the roll banks 32a, 32b, 32c may be movable relative to one another to vary a bending moment applied to the planar sheet 30 moving through the first forming roll 23. Each of the roll banks 32a, 32b, 32c may include, for example, a plurality of individual rollers independently rotatable relative to one another and arranged along a respective axis defined by a respective one of the roll banks 32a, 32b, 32c. Further, or instead, the individual rollers of a respective one of the roll banks 32a, 32b, 32c may be positionable relative to a respective axis defined by a respective one of the roll banks 32a, 32b, 32c (e.g., through an actuation signal received by the controller 28).

In general, the first forming roll 23 may impart a bending moment to the planar sheet 30 to position the first edge region 15 and the second edge region 16 adjacent to one another along the first spiral 17. In this adjacent orientation along the first spiral 17, the first edge region 15 and the second edge region 16 may be joined to one another according to any one or more of various different known joining techniques. With the first edge region 15 and the second edge region 16 joined to one another along the first spiral 17, the first spiral 17 should be understood to be a seam, and the term seam may be used interchangeably with the first spiral 17.

In certain implementations, the first edge region 15 and the second edge region 16 may be joined to one another through energy directed along the first spiral 17 by the first weld head 26. For example, the first weld head 26 may be positioned relative to the first forming roll 23 to weld the first material 12 along the first spiral 17 as the first spiral 17 is being formed in the first forming roll 23. That is, the first forming roll 23 may hold the first edge region 15 and the second edge region 16 adjacent to one another along the first spiral 17 as the first weld head 26 joins the first edge region 15 to the second edge region 16. Thus, in instances in which the first forming roll 23 forms the first spiral 17 continuously, the first weld head 26 may join the first edge region 15 to the second edge region 16 in a temporally parallel process.

The first weld head 26 may join the first edge region 15 and the second edge region 16 to one another using any welding technique compatible with the first material 12. Further, or instead, unless otherwise specified or made clear from the context, it should be understood that the first weld head 26 may include one or more weld heads and, thus, may include a plurality of weld heads operated in coordination with one another to join the first edge region 15 and the second edge region 16 to one another along the first spiral 17. As a more specific example, the first weld head 26 may include a plurality of weld heads to weld an inner surface and an outer surface of the first material 12 that has been spirally formed.

A variety of techniques for welding are known in the art and may be adapted for joining the first edge region 15 and the second edge region 16 as contemplated herein. This can, for example, include any welding technique that melts the first material 12 or other material along the first spiral 17, optionally along with a filler that material added to the joint to improve the strength of the bond. Conventional welding techniques suitable for structurally joining metal include, by way of example and not limitation: gas metal arc welding (GMAW), including metal inert gas (MIG) and/or metal active gas (MAG); submerged arc welding (SAW); laser welding; and gas tungsten arc welding (also known as tungsten, inert gas or "TIG" welding); and many others. These and any other techniques suitable for forming a structural bond between the first edge region 15 and the second edge region 16 of the first material 12 can be adapted for use in the first weld head 26 as contemplated herein. Mechanical coupling imparted by the first weld head 26 may be, for example, continuous along the first spiral 17 to provide enhanced structural strength to the tubular structure 10 being formed.

As the first material 12 is handled by the fabrication system 20 to form a seam along the first spiral 17, the second material 14 may be handled by the fabrication system 20 in a sequence of temporally parallel processes to form the second spiral 18 on the first material 12 as the first material 12 is being spiral formed. A particular advantage of such temporally parallel processing is that structural reinforcement may be applied to the tubular structure 10 with little to no increase in processing time, as compared to formation of the tubular shape of the first material 12 alone. Further, or instead, the temporally parallel processes forming the second spiral 18 on the first material 12 as the first material 12 is being spiral formed facilitate continuous formation of the tubular structure 10, which may have additional advantages associated with achieving high throughput in the fabrication of the tubular structure 10.

In general, the second material 14 may be moved through the second forming roll 24 to move the second material along a second feed direction "F2." The second material 14 moving in the feed direction "F2" may match a radius of curvature of the first material 12 exiting the first forming roll 23. That is, the second material 14 exiting the second forming roll 24 may be moved into contact with the first material 12 exiting the first forming roll 23. As an example, the second forming roll 24 may include a plurality of rollers 33a,b,c spaced relative to one another to curve the second material 14. The rollers 33a,b,c may be flanged such that the rollers 33a,b,c may engage an elongate form of the second material 14. Continuing with this example, such flanges on the rollers 33a,b,c may be useful for reducing the likelihood of inadvertent decoupling of the elongate form of second material 14 from the rollers 33a,b,c as the second material 14 moves through the rollers 33a,b,c. The flanges may further or instead be useful for maintaining the orientation of the second material 14 as the second material 14 is rolled. For example, the flanges may maintain the second material 14 in a fixed orientation such that the second material 14 is rolled around the correct bend axis.

In addition to imparting curvature to the second material 14, one or more of the rollers 33a,b,c may be driven to move the second material 14 from the second stock source 21b, through the rollers 33a,b,c, and toward the first material 12 along the second feed direction "F2." To facilitate continuous formation of the tubular structure 10, the rate at which the rollers 33a,b,c move the second material 14 in the second feed direction "F2" may be based on the rate at which the feed system 22 moves the planar sheet 30 of first material 12 in the first feed direction "F1." For example, the storage medium 29b of the controller 28 may include instructions that, when executed by the processing unit 29a of the controller 28, cause the processing unit 29a to drive the feed system 22 to move the planar sheet 30 of the first material 12 in the first feed direction "F1" and to drive the plurality of rollers 33a,b,c of the second forming roll 24 to move the second material 14 through the second forming roll at a second rate, which may be substantially equal to the first rate to facilitate substantially continuous formation of the tubular structure 10.

In certain instances, the second material 14 may be driven by the second forming roll 24 in the second feed direction "F2" and into the guide 25. In general, the guide 25 may facilitate accurately locating and securing the second material 14 onto the first material 12 according to a predetermined pattern, such as the second spiral 18 or another pattern defined relative to the first spiral 17. More specifically, in the context of substantially continuously forming the tubular structure 10, the guide 25 may position the second material 14 on the first material 12 as the first material 12 and the second material 14 are each moving.

In certain implementations, the guide 25 may include guide rollers 34. The guide rollers 34 may be positioned, for example, on either side of the second material 14 to define a channel to restrict movement of the second material 14 in at least one direction transverse to the second feed direction "F2" of the second material 14 as the second material 14 moves past the guide rollers 34 and onto the first material 12 at a predetermined position relative to the first spiral 17. Further, or instead, at least a portion of the guide 25 supporting the guide rollers 34 may be rotatable about an axis substantially parallel to an axis of rotation of the guide rollers 34. As an example, at least a portion of the guide 25 supporting the guide rollers 34 may be rotatable to change a relative orientation of the channel defined by the guide rollers 34, which may be useful for changing pitch of the second spiral 18.

The guide 25 may be positionable relative to the first forming roll 23 and the second forming roll 24 to position the second material 14 exiting the second forming roll 24 onto the first material 12 to form the second spiral 18 according to one or more predetermined parameters associated with the tubular structure 10. As an example, the guide 25 may be adjustably positioned relative to the first forming roll 23 and the second forming roll 24 to adjust a distance between the first spiral 17 and the second spiral 18. In certain implementations, the position of the guide 25 may be substantially fixed during formation of the tubular structure 10. In some implementations, however, the position of the guide 25 may be continuously controlled during formation of the tubular structure 10. Such continuous control of the position of the guide 25 may be based on any of various different feedback parameters. Further or instead, continuous control of the position of the guide 25 may be useful for forming a pattern on top of the second spiral 18. That is, the second material 14 may be directed onto the first material 12 in a sinusoidal pattern such that the second spiral 18 has an average pitch substantially equal to the pitch of the first spiral 17.

In general, the second material 14 may be joined to the first material 12 using any one or more of the joining techniques described herein and, in particular, any one or more of the joining techniques described above with respect to joining the first material 12 to itself along the first spiral 17. Accordingly, it should be understood that the second material 14 may be welded to the first material 12 along the second spiral 18 using any one or more of the welding techniques described herein.

The second weld head 27 may be positionable relative to the guide 25 such that the guide 25 may provide structural support to the second material 14 to hold the second material 14 in place relative to the first material 17 as the second material 14 is welded to the first material 12 along the second spiral 18. Thus, in certain instances, the second weld head 27 may be supported on the guide 25. Continuing with this example, the second weld head 27 may be supported on the guide 25 in a substantially fixed position relative to the channel defined by the guide rollers 34 and through which the second material 14 is moved onto the first material 12.

In certain instances, the first weld head 26 and the second weld head 27 may be controlled by the controller 28 to facilitate substantially continuous formation of the tubular structure 10. For example, the storage medium 29b of the controller 28 may include instructions that, when executed by the processing unit 29a of the controller 28, cause the processing unit to control weld parameters of the first weld head 26 based on a first rate of the first material 12 in the first feed direction "F1." Further, or instead, the storage medium 29b of the controller 28 may include instructions that, when executed by the processing unit 29a of the controller 28, cause the processing unit to control weld parameters of the second weld head 27 based on a second rate of the second material 14 through the second forming roll 24. For example, in instances in which the movement of the first material 12 in the first feed direction "F1" is interrupted, the controller 28 may interrupt energy to the first weld head 26. Similarly, in instances in which the movement of the second material 14 in the second feed direction "F2" is interrupted, the controller 28 may interrupt energy to the second weld head 27.

In certain implementations, one or more of the first weld head 26 and the second weld head 27 may be independently movable relative to other components of the fabrication system 20. Such independent movement may be useful, for example, for improved control over dimensions of the tubular structure 10 being formed. That is, independent movement of one or more of the first weld head 26 and the second weld head 27 may facilitate making incremental adjustments based on feedback as the tubular structure 10 is being formed. In certain implementations, the storage medium 29b of the controller 28 may have stored thereon instructions that, when executable by the processing unit 29a of the controller 28, cause the processing unit 29a to move the first weld head 26 to track the first spiral 17 and, further or instead, to move the second weld head 27 to track the second spiral 18.

Referring now to FIG. 4, a flowchart of an exemplary method 40 of forming a tubular structure is shown. It should be appreciated that the exemplary method 40 can be carried out, for example, by any one or more of the fabrication systems described herein to form any of the tubular structures described herein, including but not limited to a cylinder or a cone (e.g., a frusto-conical structure or segment). For example, one or more steps in the exemplary method 40 can be carried out by a processing unit of a control system (e.g., the processing unit 29a of the controller 28 in FIG. 2).

As shown in step 42, the exemplary method 40 may include positioning a first edge region of a first material and a second edge region of the first material adjacent to one another to form a first spiral. As used herein, positioning the first edge region and the second edge region adjacent to one another in this way should be understood, generally, to be used interchangeably with the term "spiral forming." In general, the first material may be a planar stock material, and the first edge region and the second edge region may be parallel to one another (e.g., as longitudinal edges) before the first material is spiral formed. Further, positioning the first edge region and the second edge region adjacent to one another may form a substantially tubular shape, with the first edge region and the second region defining a spiral extending circumferentially about the tubular shape and extending longitudinally along the tubular shape. The tubular shape may be, for example, a substantially cylindrical shape, such as a right circular cylinder, allowing for dimensional tolerances typical of spiral formation. Further, or instead, the substantially cylindrical shape may be a frusto-conical shape.

Positioning the first edge region of the first material and the second edge region of the first material adjacent to one another may include any manner and form of bending a planar form of the first material. Thus, for example, positioning the first edge region of the first material and the second edge region of the first material adjacent to one another may include moving the first material through a first forming roll. The first forming roll may include, without limitation, any one or more of the forming rolls described herein and useful for bending a planar form of the first material. As a specific example, the first forming roll may include a plurality of roll banks arranged as a triple roll. In certain instances, such as in the formation of a substantially cylindrical tubular shape from a material of uniform thickness, the relative positioning of the roll banks of the triple roll may be stationary with respect to one another. Further, or instead, in instances in which the first material is formed into a frusto-conical shape and/or in instances in which material thickness of the first material varies, the roll banks of the triple roll may be movable relative to one another to achieve a desired variation of radius of curvature of the first material moving through the triple roll.

In general, the first edge region of the first material and the second edge region of the first material may be positioned adjacent to one another to form the first spiral substantially continuously as the tubular structure is being formed. In certain implementations, substantially continuously forming the first spiral may include, for example, substantially continuously feeding a planar form of the first material into the first forming roll. As a more specific example, the planar form of the first material may be fed into the first forming roll at a substantially constant rate, which may be useful for accurately controlling one or more other steps of the exemplary method 40 relative to the formation of the first spiral. As used herein, "substantially continuously" and "substantially constant" should be understood to allow for minor, and in some cases irregular, deviations from continuous motion that do not interfere with formation of the tubular structure to within predetermined dimensional tolerances. Thus, for example, substantially continuous formation of the first spiral should be understood to account for small amounts of slippage or other unintended movement of the first material as the first material is moved using rollers or other similar mechanisms.

In general, substantially continuously forming the first spiral may facilitate substantially continuously forming the overall tubular structure. That is, as the first spiral is substantially continuously formed, timing of one or more additional steps of the exemplary method 40 may be readily controlled to form the tubular structure in a continuous process. As compared to a batch process, a manual process, or a process requiring start-stop operation, it should generally be appreciated that formation of the tubular structure in a continuous process of this type may offer cost-savings and throughput advantages useful for commercial-scale fabrication. In certain instances, sections of the continuously formed tubular structure may be severed as necessary (e.g., to form sections suitable for transportation).

As shown in step 44, the exemplary method 40 may include moving a second material onto the first material to form a second spiral as the first spiral is being formed. That is, at least a portion of the second spiral and the first spiral are formed contemporaneously. Because the second material is formed as a second spiral, the second material may be moved onto the first material substantially continuously as the tubular structure is being formed. Thus, as compared to forming support material in the shape of circumferential rings requiring manual placement, it should be appreciated that forming the second material as a second spiral may improve the speed with which the tubular structure may be formed.

The second spiral may be formed at a rate substantially equal to a rate at which the first spiral is formed, which may be useful for controlling continuous formation of the tubular structure. As used herein, substantially equal rates shall be understood to include minor differences in rates associated with, among other things, differences in mechanisms used to move two different types of materials. While variations in rates may differ among different implementations and acceptable dimensional tolerances for a particular tubular structure, an acceptable amount of variation may be a variation of less than about 10 percent.

In general, the first spiral and the second spiral may be positioned relative to one another in any one or more of various different orientations associated with imparting target structural characteristics to the tubular structure. For example, the first spiral and the second spiral may each have substantially the same pitch, with differences in pitch being minor in nature and within typical tolerances associated with spiral forming. Positioning the first spiral and the second spiral with substantially the same pitch may, for example, facilitate coordination of the formation of the first spiral and the second spiral as the tubular structure is continuously formed. Additionally, or alternatively, the second spiral may be positioned at a substantially fixed distance from the first spiral such that the second spiral provides support along the entirety of the first spiral. That is, given that the first material may be weakest along a seam formed at the first spiral, forming the second material into a second spiral at a fixed distance from a seam along the first spiral may be useful for making the tubular structure less prone to buckling. In certain implementations, a pitch of the second spiral may vary and an average pitch of the second spiral may be substantially equal to a pitch of the first spiral.

In certain implementations, the second material may be elongate. As compared to other shapes, the elongate form of the second material may be especially amenable to being moved onto the first material to form the second spiral, particularly in implementations in which the tubular structure is formed in a continuous process. For example, moving the second material onto the first material may include positioning the elongate dimension of the second material in contact with the first material. That is, the elongate dimension of the second material may be placed in contact with the first material such that the elongate dimension follows the second spiral formed by the second material. With the elongate dimension of the second material extending in this manner, the cross-section of the second material may be selected to achieve structural support and/or heat transfer suitable for a particular application. For example, a first surface of the second material in contact with the first material may have a first area, and a second surface of the material extending away from the first material may have a second area greater than the first area. In certain instances, the relatively large second surface may be exposed to air or other fluid to facilitate convective heat transfer away from the first material.

In general, the second material may have a first edge and a second edge, opposite the first edge (e.g., parallel to the first edge) along the second material. Moving the second material onto the first material may include bending the first edge of the second material to match a radius of curvature of the first material along the second spiral. Matching the radius of curvature of the first material in this way can, for example, reduce the likelihood of undesired areas of separation between the second material and the first material. In turn, reducing the likelihood of unwanted separation between the second material and the first material may facilitate joining the second material to the first material in a consistent manner, which may be particularly advantageous for achieving target structural characteristics of the tubular structure being formed.

In certain implementations, moving the second material onto the first material to form the second spiral may include moving the second material through a guide, such as any one or more of the guides described herein. That is, the second material may be moved through the guide along a trajectory of the second spiral being formed as the guide limits deviation of the second material away from the trajectory of the second material. The guide may hold the second material in place relative to the first material as the second material is joined (e.g., welded) to the first material according to any one or more of the methods described herein.

In certain implementations, moving the second material onto the first material may include directing the second material through a second forming roll, such as any one or more of the second forming rolls described herein. Thus, for example, in instances in which the second material is elongate, the second forming roll may include a plurality of flanged rollers driven to move the second material. In general, the second forming roll may move the second material toward the guide. More specifically, the second forming roll may continuously move the second material toward the guide such that the second spiral is continuously formed, in turn facilitating continuous formation of the tubular structure.

As shown in step 46, the exemplary method 40 may include joining the first edge region of the first material to the second edge region of the first material along the first spiral. In general, as the first edge region is joined to the second edge region along the first spiral, a substantially rigid shape may be formed. As used herein, the substantially rigid shape shall be understood to be at least rigid enough for the second material to be joined to the first material without deforming the substantially rigid shape and without the use of an auxiliary support, such as a mandrel or other similar mechanism.

Joining the first edge region of the first material to the second edge region of the first material along the first spiral may include any manner and form of joining compatible with the first material and useful for securing these edge regions to one another with strength sufficient for an intended application of the tubular structure being formed. For example, in instances in which the first material is metal, joining the first edge region of the first material to the second edge region of the first material may include welding the edge regions to one another. Gluing and/or taping the first edge region to the second edge region may be additionally, or alternatively, used to join the first edge region to the second edge region.

As shown in step 48, the exemplary method 40 may include joining the second material to the first material along the second spiral. In general, the rate and timing of joining the second material to the first material along the second spiral may be selected relative to the rate and timing of joining the first material to itself to facilitate forming the tubular structure in a continuous process. By way of example, along at least a portion of the second spiral, the second material may be joined to the first material as the first edge region of the first material is joined to the second edge region of the first material. That is, the joining processes may be at least partially temporally overlapping. As a more specific example, the first material may be joined to itself along the first spiral slightly ahead of the joining of the second material to the first material along the second spiral such that the joined first material may form a stable working surface as the second material is being joined to the first material. Additionally, or alternatively, the first edge region of the first material may be joined to the second edge region of the first material along the first spiral at a rate substantially equal to a rate at which the second material is joined to the first material along the second spiral.

In general, the second material may be joined to the first material using any one or more of various different joining techniques suitable for joining the second material to the first material with strength sufficient for meeting structural performance criteria of the tubular structure being formed. For example, in instances in which the second material and the first material are formed of the same metal, the second material may be joined to the first material by welding the second material to the first material according to any one or more of the welding techniques described herein. Further or instead, the second material may be joined to the first material using glue, tape, or other similar technique, such as may be particularly useful in instances in which one or both of the first material and the second material is formed of a polymer.

In general, second material may be joined to the first material along an outer surface of a tubular shape formed by the first material. Joining the second material along the outer surface may be particularly useful for accurate placement of the second material at least because the outer surface is more readily accessible than the inner surface. Further, or instead, joining the second material along the outer surface may be particularly useful in instances in which the second material acts as a heat sink to facilitate heat transfer from the first material to fluid flowing past the tubular structure.

While certain embodiments have been described, other embodiments are additionally or alternatively possible.

Figure 5A:
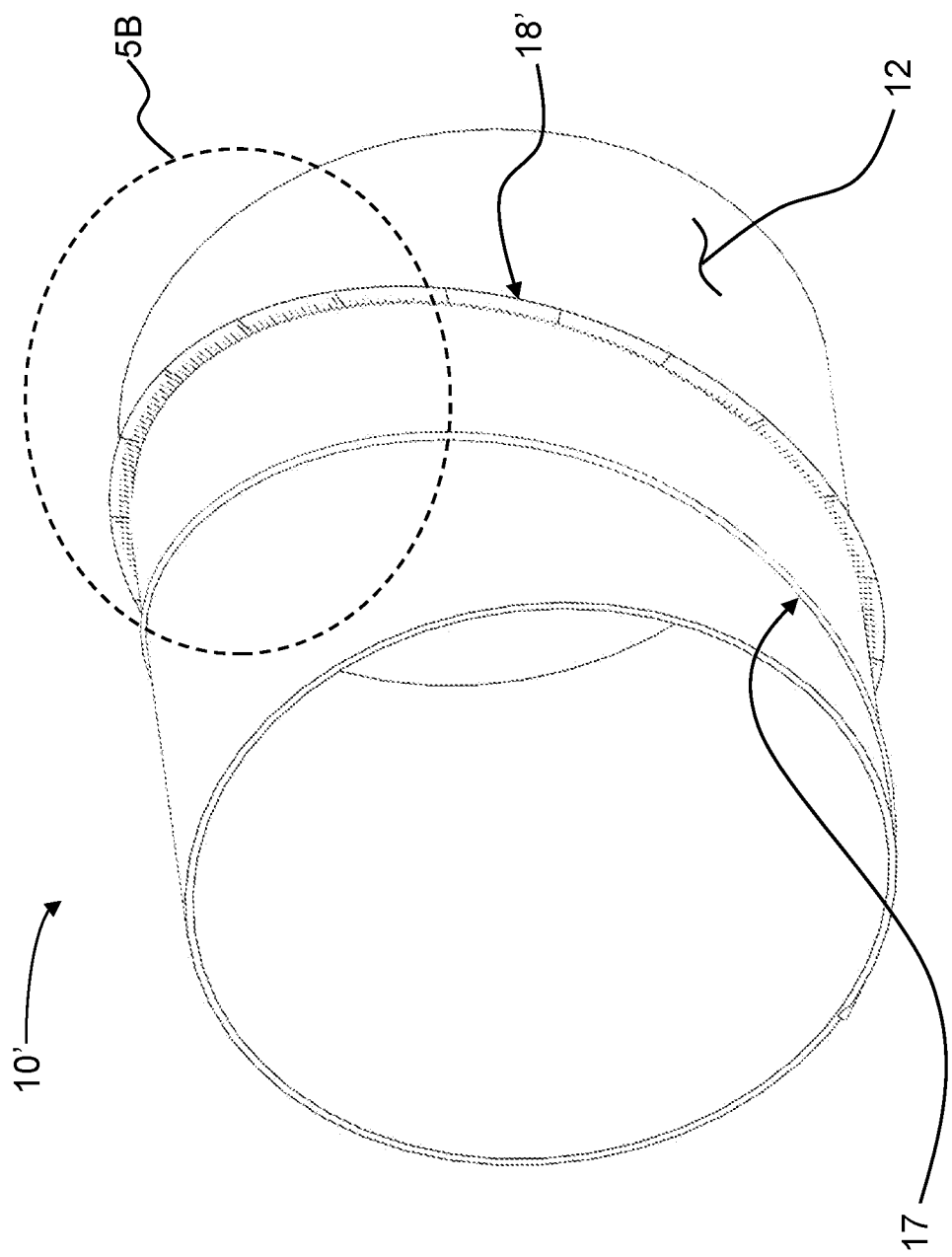
FIG. 5A is a perspective side view of a tubular structure including a corrugated reinforcing material.
Figure 5B:
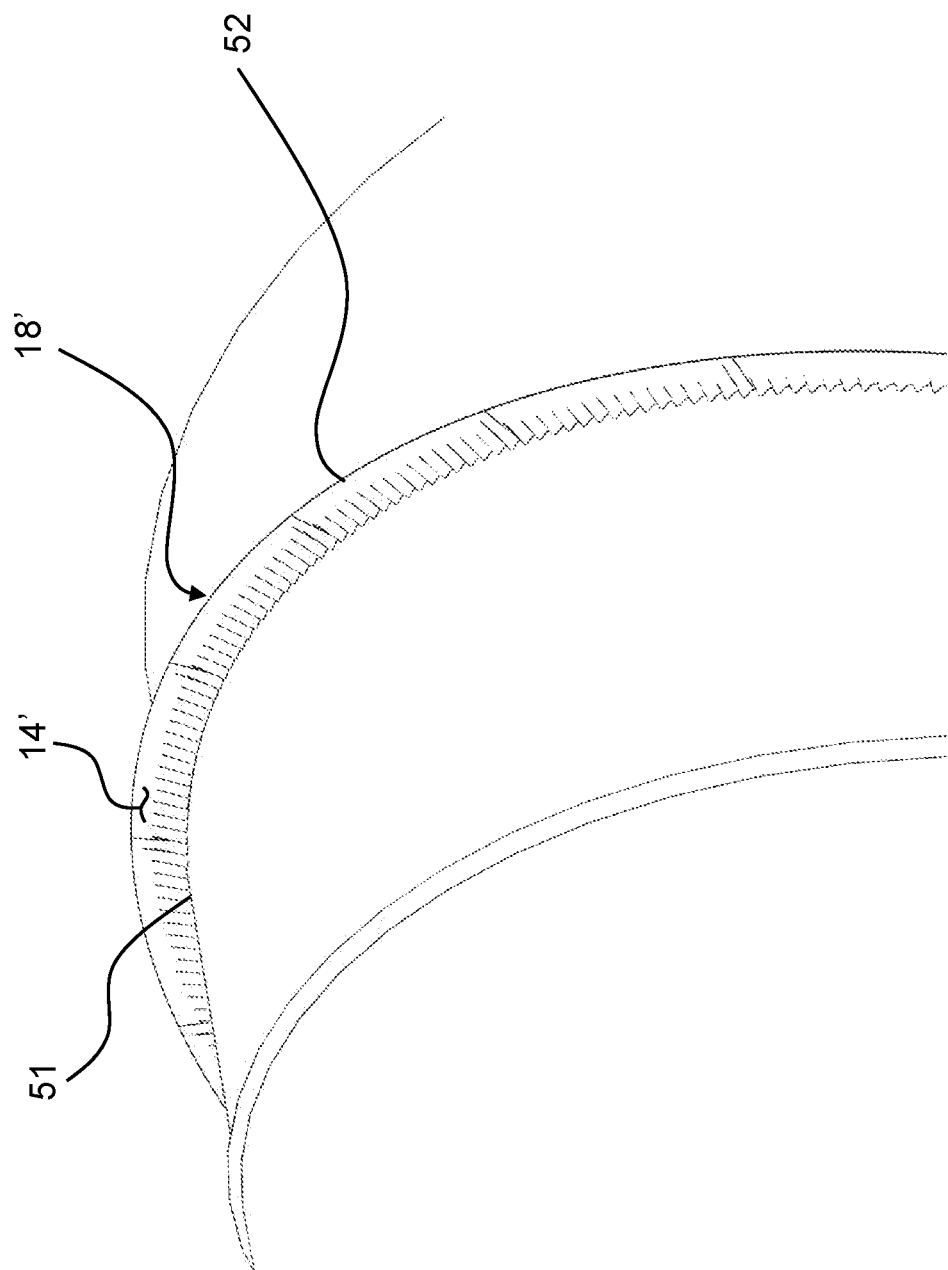
FIG. 5B is a perspective side view of the portion of the tubular structure along the area of detail 5B in FIG. 5A.

For example, while the second material used to reinforce the tubular structure has been described as being an elongate strip of material, it should be appreciated that other shapes of the second material are additionally or alternatively possible. Referring now to FIGS. 5A and 5B, a tubular structure 10' may be formed from the first material 12 and a second material 14'. For the sake of clarity and efficient description, an element designed with a prime (') element number in FIGS. 5A and 5B should be understood to be similar to a corresponding element designated with an unprimed element number in other figures of the present disclosure and, thus, are not described separately from counterpart unprimed elements, except to note differences or to describe features that are more easily understood with reference to FIG. 5. Thus, for example, the tubular structure 10' shall be understood to be similar to the tubular structure 10 (FIG. 1A), unless otherwise specified or made clear from the context. Further, or instead, the second material 14' should be understood to be similar to the second material 14 (FIG. 1A), except that the second material 14' is at least partially corrugated, which may facilitate moving the second material 14' onto the first material 12 along a second spiral 18'. As used herein, the term "corrugated" shall be understood to include a pattern of alternating ridges and grooves and, thus, includes substantially sinusoidal patterns definable by a period and amplitude.

The second material 14' may include a first edge 51 having a first corrugated pattern as the second material 14' is moved onto the first material 12. For example, the first edge 51 may be moved onto the first material 12 such that the corrugated pattern is in edge-wise contact with a circumference of the tubular shape of the first material 12 along the second spiral 18'. That is, through edge-wise contact, the corrugated pattern of the first edge 51 is in contact with the first material 12 along the entire period of the corrugated pattern. As compared to a noncorrugated pattern, the corrugated pattern of the first edge 51 may facilitate bending the second material 14' with lower forces than may be required for similar noncorrugated material, potentially simplifying and/or reducing the cost of the system used for joining the second material 14' to the first material 12.

The second material 14' may include a second edge 52 that is away from the first material 12 as the second material 14' is in contact with the first material 12 along the second spiral 18'. In certain implementations, the second edge 52 may be non-corrugated. In some implementations, however, the second material 14' may include a second edge 52 having a second corrugated pattern as the second material 14' is moved onto the first material 12. The second edge 52 may be, for example, opposite the first edge 51 such that each of the first edge 51 and the second edge 52 extend along a longitudinal dimension of the second material 14'. In particular, the first edge 51 and the second edge 52 may be coextensive with one another along the longitudinal dimension of the second material 14'. As compared to a noncorrugated pattern, corrugation of the second edge 52 may be useful for providing enhanced heat transfer characteristics in implementations in which heat transfer is a meaningful design consideration for the tubular structure 10' being formed.

In certain instances, the first corrugated pattern of the first edge 51 may be the same as the second corrugated pattern of the second edge 52 prior to moving the second material 14' onto the first material 12 to form the second spiral 18'. As the first edge 51 of the second material 14' is bent to match the radius of curvature of the first material 12, the first corrugated pattern of the first edge 51 may change relative to the second corrugated pattern of the second edge 52. That is, the first corrugated pattern along the first edge 51 may become more compacted than the second corrugated pattern along the second edge 52. Continuing with this example, in terms of the characteristics of the respective corrugated patterns, the amplitude of the first corrugated pattern along the first edge 51 in contact with the first material 12 may be greater than an amplitude of the second corrugated pattern along the second edge 52 away from the first material 12.

Figure 2:
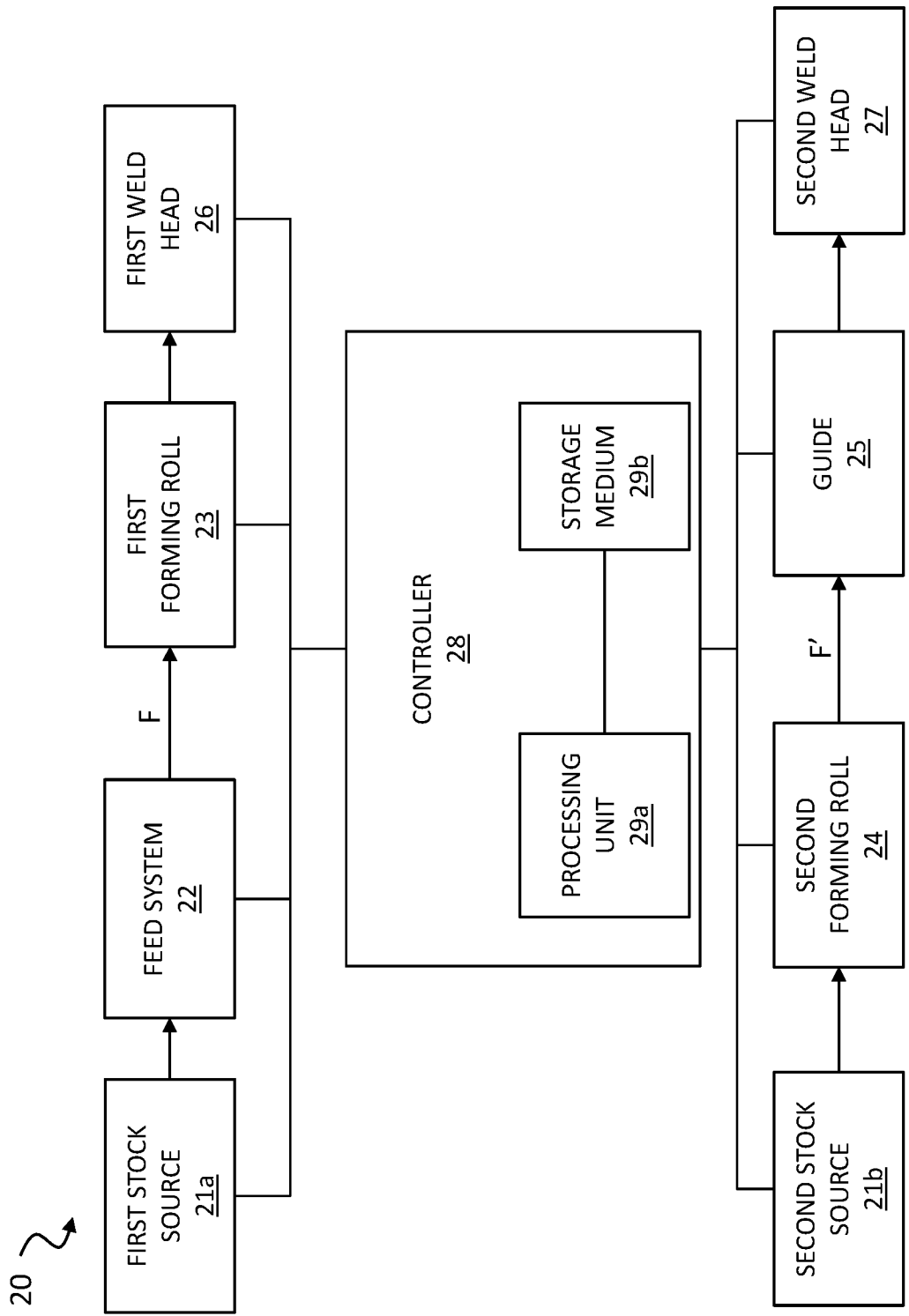
FIG. 2 is a block diagram of a fabrication system for forming the reinforced spiral formed tube of FIG. 1.
Figure 3A:
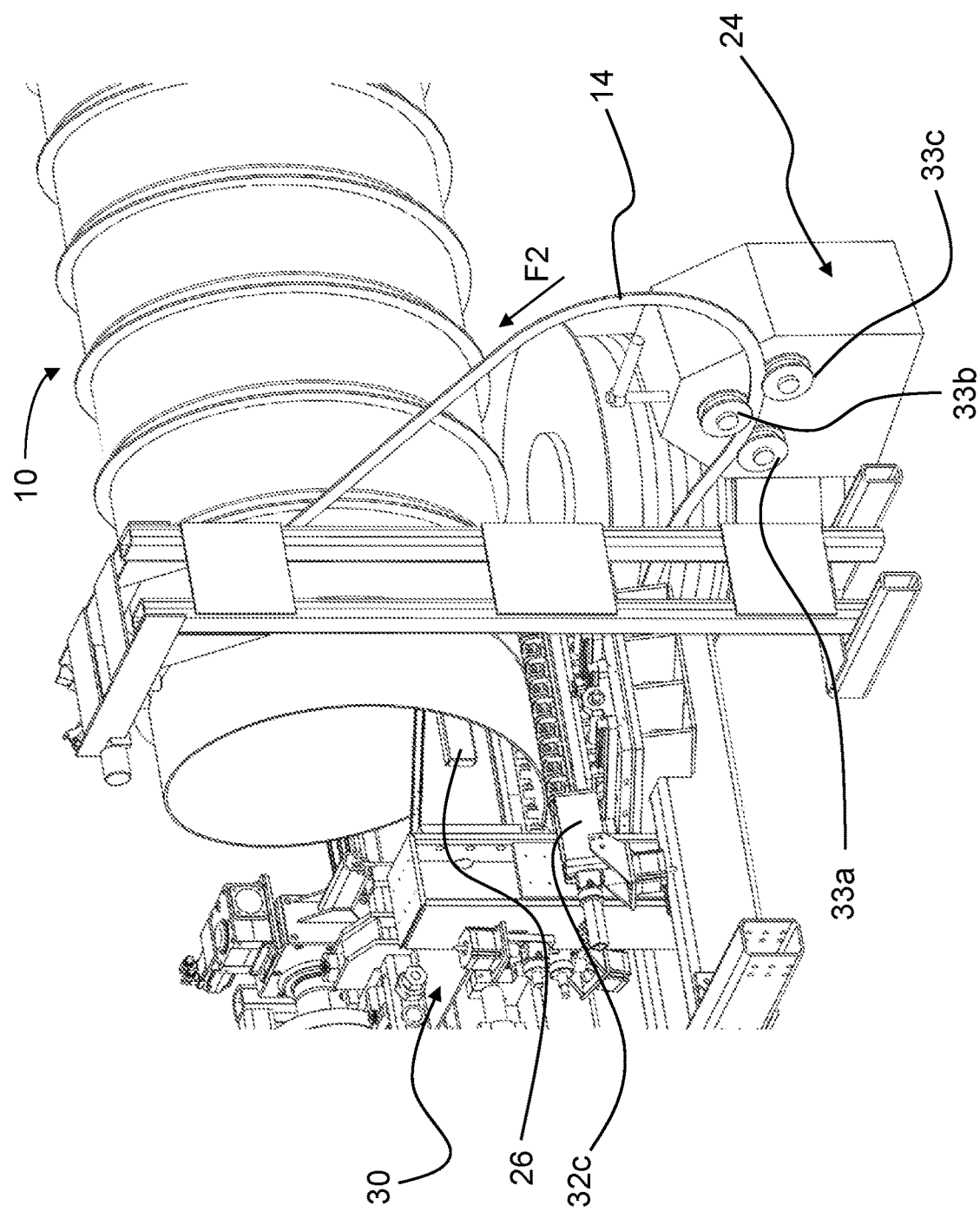
FIG. 3A is a rear perspective view of tubular structure formation carried out by the fabrication system of FIG. 2.
Figure 3B:
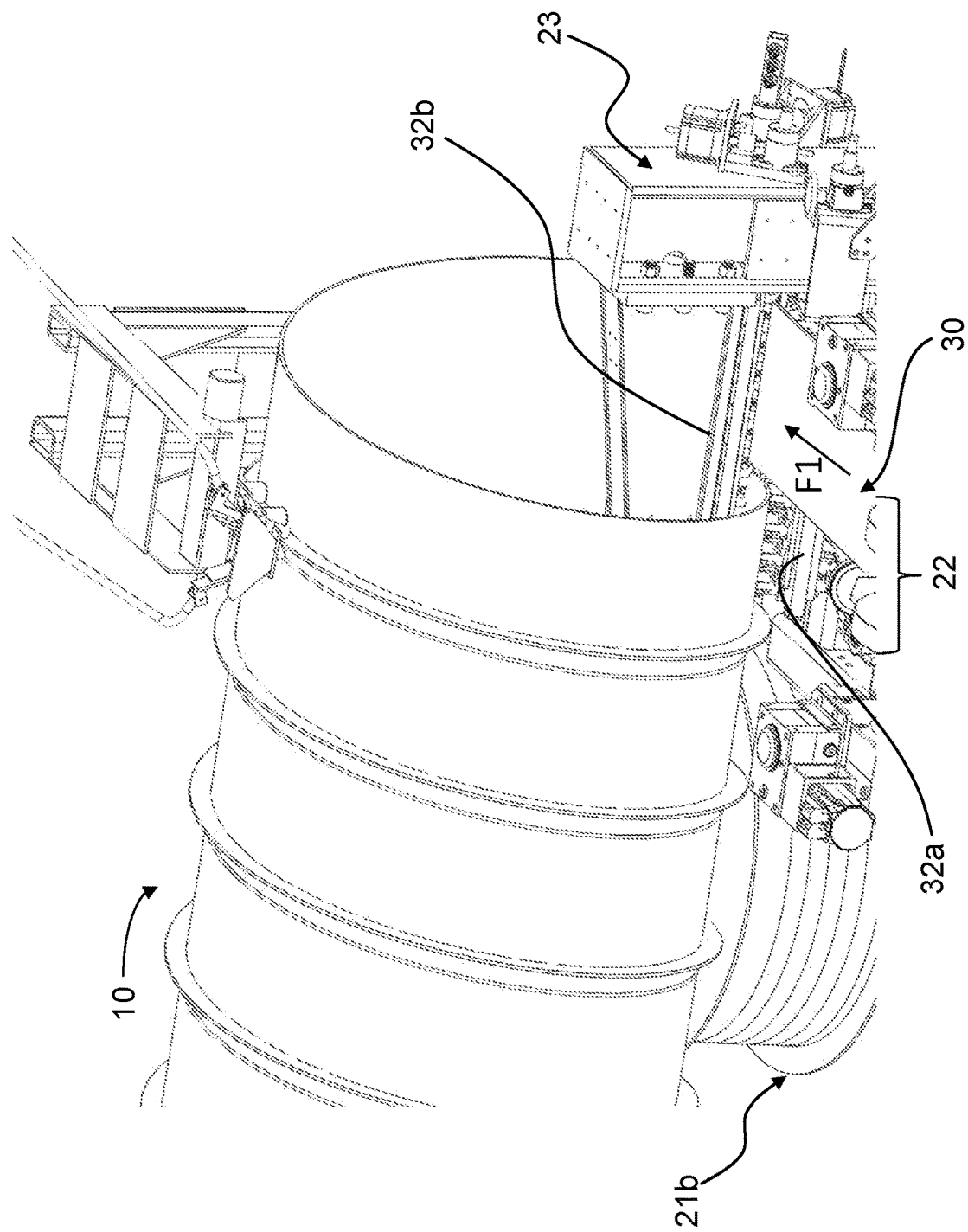
FIG. 3B is a front perspective view of the tubular structure formation of FIG. 3A.
Figure 3C:
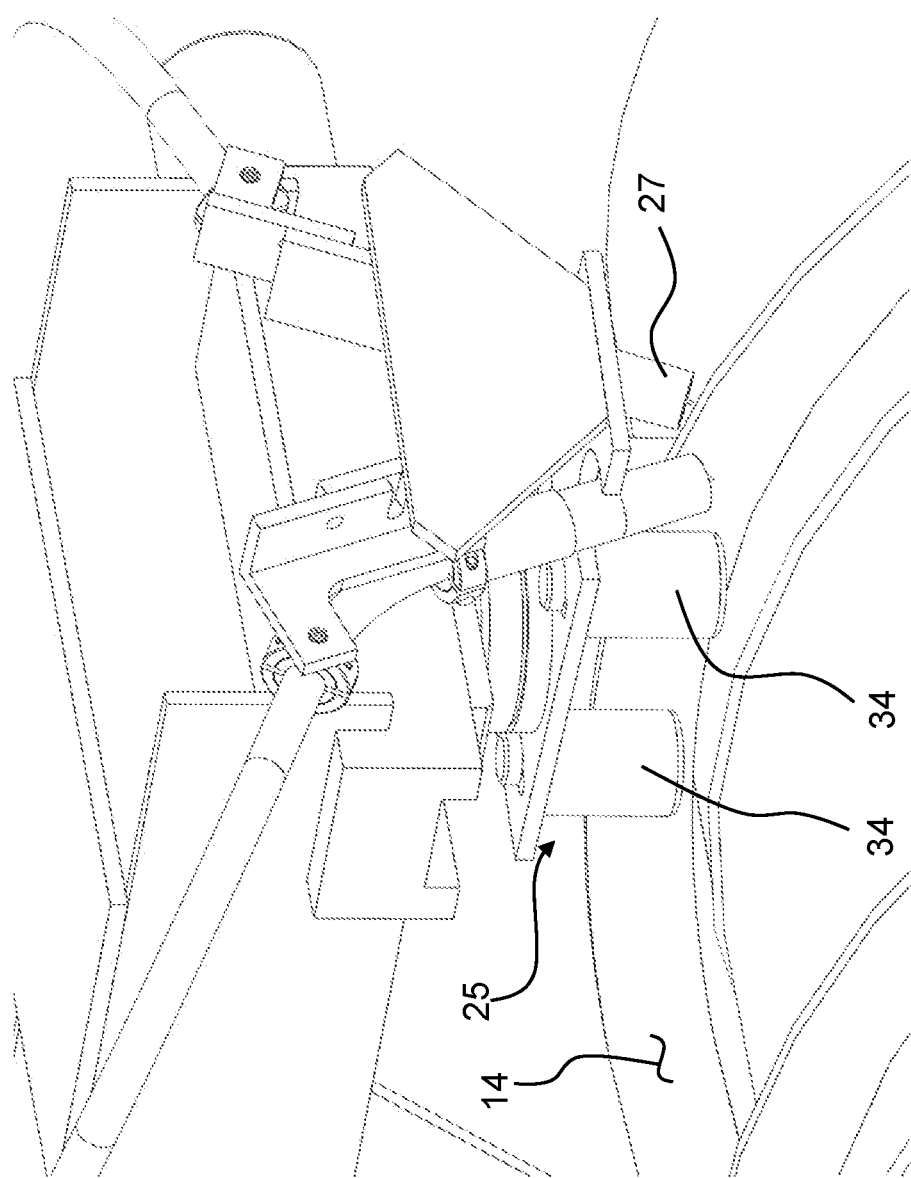
FIG. 3C is a perspective side view of a second material moving onto a first material as the tubular structure is formed in FIG. 3A.
Figure 3D:
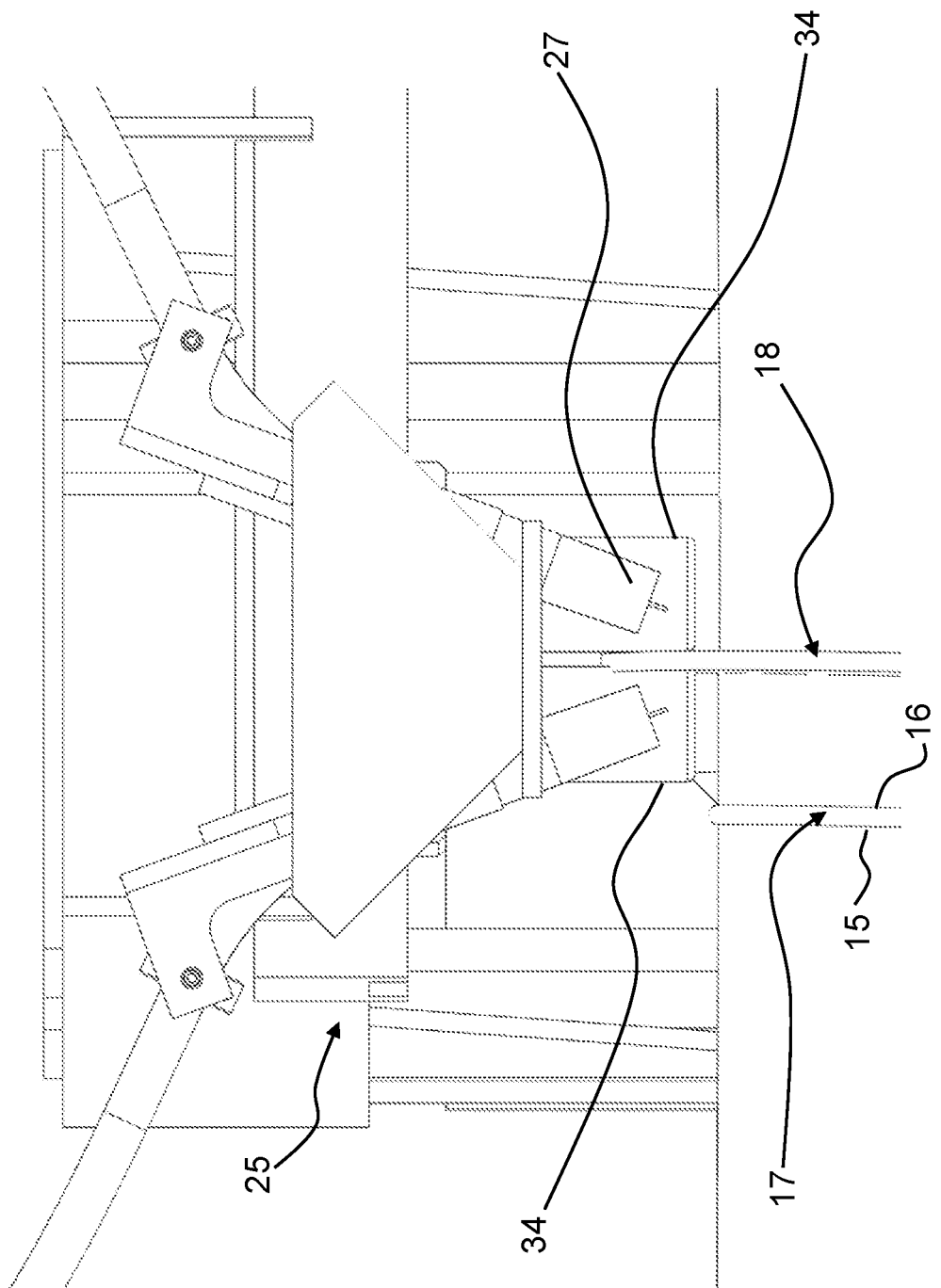
FIG. 3D is a front view of the second material moving onto the first material in FIG. 3C.

In general, the tubular structure 10' may be formed using any one or more of the devices systems and methods described herein, unless otherwise specified or made clear from the context. Thus, in general, the tubular structure 10' may be formed using the fabrication system 20 (FIG. 2). Further, or instead, it should be appreciated that the tubular structure 10' may be formed according to the exemplary method 40 (FIG. 4).

The corrugated pattern on one or both of the first edge 51 and the second edge 52 may be formed prior to moving the second material 14' into contact with the first material 12. That is, the second material 14' may be in a corrugated form as the second material 14' is stored in the second stock source 21b (FIG. 2). Preforming the corrugated pattern in this way may be useful for controlling dimensional tolerance of the corrugated pattern. Further, or instead, preforming the corrugated pattern may simplify the machinery required to form the tubular structure 10. That is, in certain instances, the preformed corrugated pattern may impart sufficient flexibility to the second material 14' such that second material 14' may be bent onto the first material 12 without the use of the second forming roll 24. In such instances, force exerted by the guide 25 may be sufficient to bend the second material 14' to match a radius of curvature of the first material 12.

In certain instances, the corrugated pattern along the first edge 51 may be formed as the second material 14' is moved onto the first material 12. For example, the corrugation may be formed in the second material 14' through any one or more of various different known corrugation methods as the second material 14' moves through a guide (such as the guide 25 of the fabrication system 20 in FIG. 2). Additionally, or alternatively, corrugation may be formed in the second material 14' between the second stock source 21b and the guide 25, or any other similar location along the fabrication system 20 (FIG. 2). Forming the corrugation pattern as the second material 14' is moved onto the first material 12 may be useful, for example, for adjusting the corrugation pattern as necessary to account for dimensional variance along the tubular structure 10' being formed. In certain instances, the second edge 52 may remain noncorrugated as the first corrugation pattern is formed along the first edge 51 of the second material 14'.

While the second material 14' may be usefully handled by a guide such as the guide 25 of the fabrication system 20 (FIG. 2), certain accommodations may be made for handling the corrugated pattern without deforming the pattern. For example, the size of the guide rollers 34 may be substantially large relative to the characteristics of the corrugated pattern such that the guide rollers 34 do not engage the corrugated pattern as the second material 14' moves through the guide 25.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method of forming a tubular structure, the method comprising:
    positioning a first edge region of a first material and a second edge region of the first material in an edge-to-edge abutting relationship to one another to form a first spiral extending along an outer surface of the first material;
    moving an elongate edge of a second material onto the outer surface of the first material to form a second spiral as the first spiral of the edge-to-edge abutting relationship of the first material is being formed, wherein the first spiral and the second spiral are longitudinally spaced relative to one another along the outer surface of the first material;
    joining the first edge region of the first material to the second edge region of the first material in the edge-to-edge abutting relationship along the first spiral; and
    welding the elongate edge of the second material to the first material along the second spiral,
    wherein
        the first material and the second material are each formed of metal,
        the elongate edge of the second material has a first area in contact with the first material along the second spiral,
        a surface of the second material has a second area in a direction extending radially from the elongate edge of the second material, and
        the second area of the surface of the second material is greater than the first area of the elongate edge of second material in contact with the outer surface of the first material.

2. The method of claim 1, wherein the first edge region of the first material and the second edge region of the first material are positioned adjacent to one another to form the first spiral substantially continuously as the tubular structure is being formed.

3. The method of claim 2, wherein the second material is moved onto the first material substantially continuously as the tubular structure is being formed.

4. The method of claim 1, wherein the first spiral is formed at a first rate substantially equal to a second rate at which the second spiral is formed.

5. The method of claim 1, wherein the first edge region of the first material is joined to the second edge region of the first material along the first spiral at a first rate substantially equal to a second rate at which the second material is joined to the first material along the second spiral.

6. The method of claim 1, wherein, along at least a portion of the second spiral, the second material is joined to the first material as the first edge region of the first material is joined to the second edge region of the first material along the first spiral.

7. The method of claim 1, wherein, with the first edge region and the second edge region of the first material adjacent to one another, the first material has a substantially cylindrical shape.

8. The method of claim 7, wherein joining the second material to the first material includes joining the second material to an outer surface of the substantially cylindrical shape.

9. The method of claim 1, wherein the first spiral and the second spiral each have substantially the same pitch.

10. The method of claim 1, wherein a pitch of the second spiral varies and an average pitch of the second spiral is substantially equal to a pitch of the first spiral.

11. The method of claim 1, wherein joining the first edge region of the first material to the second edge region of the first material along the first spiral includes welding the first edge region of the first material to the second edge region of the first material.

12. The method of claim 1, wherein positioning the first edge region of the first material and the second edge region of the first material adjacent to one another includes moving the first material through a first forming roll.

13. The method of claim 12, wherein moving the second material onto the first material to form the second spiral includes moving the second material through a guide.

14. The method of claim 13, wherein moving the second material onto the first material further includes directing the second material through a second forming roll, the second forming roll moving the second material toward the guide.

15. The method of claim 1, wherein moving the second material onto the first material includes bending the edge of the second material to match a radius of curvature of the first material along the second spiral.

16. A method of forming a tubular structure, the method comprising:
positioning a first edge region of a base metal and a second edge region of the base metal adjacent to one another in an edge-to-edge abutting relationship to form a first spiral extending along an outer surface of the base metal;
moving an elongate edge of a reinforcement metal onto the outer surface of the base metal as the first spiral of the edge-to-edge abutting relationship of the base metal is formed, the elongate edge of the reinforcement metal forming a second spiral along the outer surface of the base metal;
joining the first edge region and the second edge region of the base metal to one another in the edge-to-edge abutting relationship along the first spiral; and
joining the base metal to the reinforcement metal along the second spiral.

17. The method of claim 16, wherein the reinforcement metal has a surface extending radially away from the elongate edge of the reinforcement metal, the elongate edge of the reinforcement metal has a first area, and the surface of the reinforcement metal extending radially away from the elongate edge of the reinforcement metal has a second area greater than the first area.

18. The method of claim 16, wherein the direction extending radially away from the elongate edge of the reinforcement metal to the base metal is perpendicular to a surface of the base metal formed by the first spiral.

19. The method of claim 16, wherein joining the base metal to itself along the first spiral includes welding the base metal to itself.

20. The method of claim 16, wherein joining the base metal to the reinforcement metal along the second spiral includes welding the base metal to the reinforcement metal.

* * * * *